Jan. 9, 1945.　　　　F. E. FINLAYSON　　　　2,367,014
CIRCUIT CONTROLLING DEVICE
Filed Feb. 17, 1943
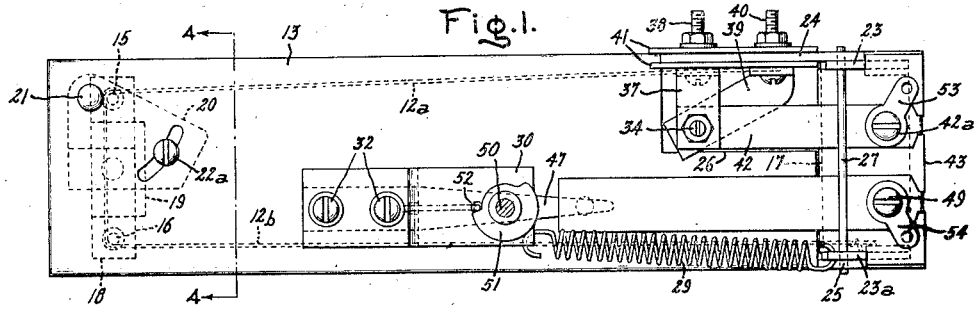
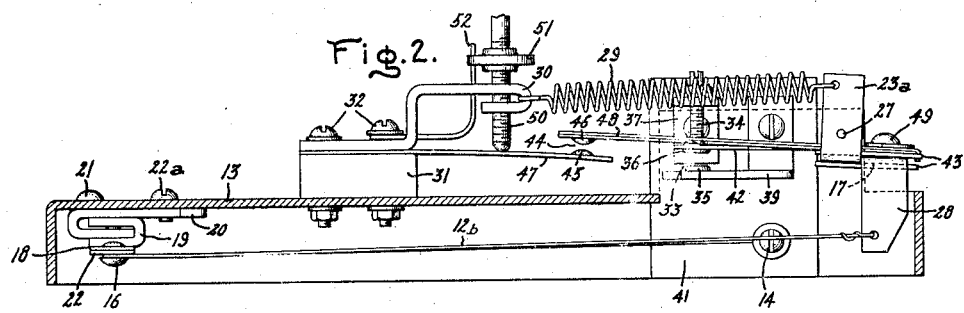
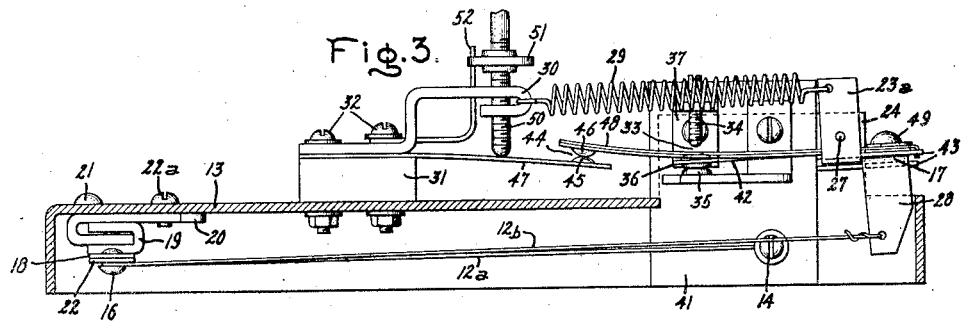
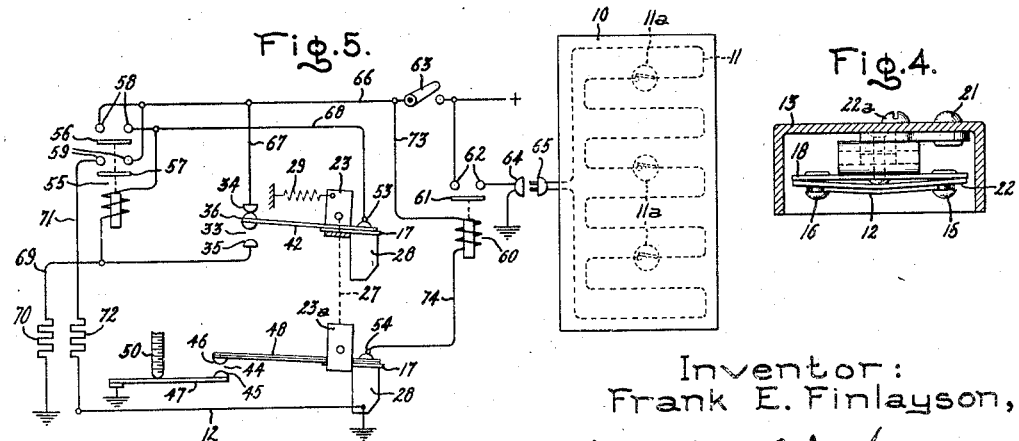
Inventor:
Frank E. Finlayson,
by Harry E. Dunham
His Attorney.

Patented Jan. 9, 1945

2,367,014

UNITED STATES PATENT OFFICE 2,367,014

CIRCUIT CONTROLLING DEVICE

Frank E. Finlayson, Ontario, Calif., assignor to General Electric Company, a corporation of New York Application February 17, 1943, Serial No. 476,203

4 Claims. (Cl. 175—373)

This invention relates to a circuit controlling device, more particularly to such a device for controlling the power input to a translating device and for adjusting it in accordance with ambient temperature variations so as to hold a substantially uniform temperature condition.

While not limited thereto, this invention is particularly useful in controlling the energy input to electrically heated blankets, clothes and the like.

In accordance with this invention, a thermally responsive timing member operates a movably mounted control member. The control member is alternately operated to two controlling positions to control the heating and cooling of the timing member responsively to the movement of the timing member as it heats and cools. A thermostat responsive to ambient temperature is connected to the control member so as to be continuously moved with it between controlling positions as the control member moves between its controlling positions. The thermostat operates a suitable circuit control switch between a pair of controlling positions. For example, it may operate a switch in this way in order to increase and decrease the power fed to an electrically heated blanket, suit, or the like. The proportion of time that power is fed to the controlled device to the time that it is cut off from it during each cycle of the control member is determined by the deflection of the thermostat as it responds to the ambient temperature so that a substantially consant temperature condition is maintained in the controlled device.

For a more complete understanding of this invention, reference should be had to the accompanying drawing in which Fig. 1 is a top plan view of a circuit controller embodying this invention; Fig. 2 is a sectional elevation taken through the control device of Fig. 1; Fig. 3 is a view similar to Fig. 2 but illustrating certain elements of the control device in different operative positions; Fig. 4 is a sectional view taken through the line 4—4 of Fig. 1 and looking in the direction of the arrows; and Fig. 5 is a diagrammatic view illustrating the circuit controlling device of this invention and the connections between it and a controlled device, such as a blanket.

Referring to the drawing, this invention has been shown in one form as applied to a circuit controller which controls the power input to an electrically heated blanket 10. This blanket 10 is provided with a resistance heating circuit 11 which when supplied with power heats the blanket. Included in this circuit are a plurality of over-temperature protective devices 11a.

The circuit control device comprises an electro-thermally responsive element 12 which is in the form of an elongated electrically conducting wire. The wire 12 is mounted within a channel shaped casing 13, which may be formed of metal or a suitable molded plastic material. As shown, the wire has one length 12a anchored to a screw 14 mounted in one side wall of the casing, and which length extends forwardly along this side of the casing; the wire thence is directed around a stud 15, extends laterally across the casing, and thence is directed around a stud 16 into a length 12b extending along the other side of the casing; the end of the length 12b is anchored to a supporting member 17. The anchor screw 14 also functions as a binding post. The two studs 15 and 16 are mounted upon an insulating supporting plate 18 extending transversely across the casing, and this plate in turn is secured to a U-shaped supporting bracket 19. The bracket 19 is mounted upon and interfitted with a U-shaped bracket 20 in the manner clearly shown in Figs. 2 and 3. The bracket 20 is pivotally mounted upon a stud shaft 21 fixed in the top wall of the casing so that it may be angularly adjusted. When the bracket 20 is so adjusted, it will adjust the position of the supporting plate 18 so as to vary the tension in the wire 12. The wire 12 is electrically insulated from the rivets holding supporting plate 18 by means of a sheet of electrically insulating material 22. The bracket 20 is secured from turning by means of a set screw 22a.

The supporting member 17 is of plate-like form, and at its sides it is provided with upright sections 23 and 23a. These sections are pivotally secured to upright sections 24 and 25 of the casing extending upwardly from an irregularly shaped opening 26 provided in the top wall of the casing; it is pivotally secured to these members 24 and 25 by means of a shaft 27. The wire 12 is anchored to a member or section 28 depending from the plate 17, as shown.

A tension spring 29 has one end secured to the upright section 23a of the support 17, and has its other end secured to a fixed anchor 30 which is secured to the top wall of the casing 13 through a supporting block 31 which is attached to the top wall by means of bolts 32, as shown. This spring biases the support 17 in a counter-clockwise direction, and therefore tensions the wire 12.

The electro-thermally responsive wire 12 is alternately energized and deenergized so that it is heated and permitted to cool in order to cause it to expand and contract in a predetermined cycle. A suitable control switch 33 controls the energization and deenergization of the wire 12. This switch comprises a pair of spaced apart fixed contacts 34 and 35, and a contact 36 which moves between them. The fixed contact 34 is in the form of an adjustable, threaded member which is screwed into a support 37 which mounts it on the upright plate 24; this support 37 is secured to the plate 24 by means of a bolt 38 which also functions as a binding post. The contact 35 is mounted upon a rigid conducting lead 39 which also is secured to the upright supporting member 24 by means of a bolt 40 which also functions as a binding post. The supporting members 37 and 39 and the binding posts 38 and 40 are electrically insulated from the supporting section 24 by sheets of electrically insulating material 41 positioned on opposite sides of the section 24. These sheets also function to insulate the anchor and binding post 14 from the casing 13.

The movable contact 36 of the switch 33 is mounted upon one end of a resilient switch arm 42, the opposite end of which is rigidly secured to the supporting plate 17 by means of a bolt 42a. The switch arm and bolt are electrically insulated from the plate 17 by sheets of electrically insulating material 43 on opposite sides of the plate, as shown in Figs. 2 and 3.

As will be pointed out in greater detail hereinafter when a complete description of the operation of the control device is made, when the movable contact 36 is in contact with the fixed contact 34, an energizing circuit will be completed for the wire 12 so that current is directed through it. The wire 12 will expand responsively to its energization and as it expands the support 17 will be moved by spring 29 in a counterclockwise direction, as viewed in Figs. 2 and 3, in order to move the fixed contact 36 away from contact 34 and into engagement with the lower contact 35. When this occurs the wire will be deenergized, whereupon it will cool and return the movable contact 36 into engagement with fixed contact 34 which operation will again energize the wire to repeat the cycle. In this way, the supporting member 17 is oscillated back and forth between a pair of controlling positions. The wire 12, therefore, functions as a timing device which oscillates the support back and forth in a predetermined timed cycle.

This oscillation of the support is utilized to control the power input to the controlled blanket 10. The power input to the blanket 10 is controlled by means of a switch 44 comprising a normally fixed contact 45 and a movable contact 46. The fixed contact 45 is mounted upon one end of a resilient supporting arm 47, the opposite end of which is anchored to the block 31; as shown, it is sandwiched between the block 31 and the anchor 30 and is secured by the bolts 32.

The movable contact 46 is mounted upon one end of a bimetallic thermostat 48. The opposite end of this thermostat is rigidly secured to the supporting plate 17 by means of a bolt 49, and it is electrically insulated from the plate 17 by means of the electrically insulating sheets 43.

It will be observed that when the support 17 is oscillated it will also oscillate the thermostat 48 so as to control the opening and closing of the contacts 45 and 46, and in this way control the "On" and "Off" heat periods of the blanket 10.

The position of the fixed contact 45 may be adjusted to control these "On" and "Off" periods by varying the position of the resilient switch arm 47, and this may be done by means of an adjusting screw 50 threaded in the anchor member 30 and bearing on the upper side of the resilient arm, as clearly shown in Figs. 2 and 3. Fastened to the screw 50 is a stop member 51 which engages a fixed stop 52 which limits the angular movement of the screw and thereby determines the limiting positions of the fixed contact 45.

The bimetallic thermostatic member 48 responds to the ambient temperature and deflects away from or toward the fixed contact 45 as this temperature rises and falls so as to control the proportion of time that the contacts of the switch 44 are closed to the time that they are open for each cycle of operation of the electrothermally responsive wire 12.

The switch arm 42 is provided with a binding member 53, and the bimetallic thermostatic element 48 is provided with a binding member 54.

The way in which the control device may be electrically connected in a circuit to control the blanket 10 is illustrated in Fig. 5. As here shown, the control switch 33 for the thermal timing element 12 controls the energization and deenergization of this element through a suitable control relay 55. The relay 55 is provided with a pair of movable contacts 56 and 57 which cooperate with pairs of spaced apart fixed contacts 58 and 59 respectively. The power switch 44 controlling the power input to the blanket 10 controls the energization and deenergization of the blanket through a power relay 60 having a movable contact 61 that coacts with spaced apart fixed contacts 62. It will be understood that the various binding posts 14 for the wire, 38 and 40 for the fixed contacts 34 and 35 of switch 33, binding members 53 and 54 of the switch arm 42 and bimetallic thermostat 48, all will be used to electrically interconnect the control device into the circuit shown in Fig. 5.

Furthermore, it is preferable that the control device be provided with a suitable "On" and "Off" switch 63 which is shown diagrammatically in Fig. 5; and also that it be provided with a socket 64 into which the blanket may be plugged, as also shown diagrammatically in Fig. 5.

In the operation of the control device in controlling the blanket, it will be understood that the blanket twin-terminal plug 65 will be inserted in the plug 64, and the switch 63 will be closed. At this time, the wire 12 will be cold and will be contracted so that the control device elements will have their positions shown in Figs. 2 and 5. In other words, the contacts 34 and 36 will be closed, and the switch contacts 45 and 46 of switch 44 will be opened. Therefore, when the switch 63 is closed, the control relay 55 will be energized to close its two sets of contacts 58 and 59 by means of a circuit which may be traced from the positive side of the supply source, through the switch 63, the conductor 66, the conductor 67, closed contacts 34 and 36, switch arm 42, binding member 53, conductor 68, and thence through the operating coil of the relay 55, conductor 69 and resistance 70 to the ground, or the opposite conductor of the supply source. When the control relay 55 closes, it will establish a holding circuit for itself, which circuit may be traced from the conductor 66 through the closed contacts 58, and thence through the operating coil of the relay, the conductor 69 and resistance 70 to the ground. Also, the wire 12 will be energized by means of a circuit which may be traced from the wire 66, through the closed contacts 59, the wire 71, resistance 72, wire 12 and thence to the ground, or opposite side of the supply source.

The wire 12 when energized will heat up and elongate, and as it elongates the support 17 will rotate in a counterclockwise direction. This operation will cause the contact 36 to move away from the fixed contact 34; the relay 55, however, will not be deenergized by this operation because its independent holding circuit will remain closed. Eventually when the wire 12 has expanded by a predetermined amount the support 17 will have been rotated far enough to permit the movable contact 36 to contact the fixed contact 35. This operation will short-circuit the operating coil of relay 55 and, therefore, will permit the wire to open. This operation, of course, will deenergize the wire 12 in order to permit it to cool. When it cools, it will contract and rotate the support 17 in the clockwise direction and eventually will move the contact 36 to reengage the fixed contact 34 to repeat the cycle just described. In this way, the support 17 will oscillate the switch arm 42 back and forth between the contacts 34 and 35 in a timed cycle in order to alternately energize and deenergize the wire 12.

At the same time that the support 17 oscillates the switch arm 42, it oscillates the bimetallic thermostat 48, and moves it into engagement with fixed contact 45 and away from it. When it moves the contact 46 into engagement with the contact 45, an energizing circuit for the power relay 60 is completed from the positive side of the supply source, through the switch 63, the conductor 73, operating coil of power relay 60, conductor 74, binding post 54, and bimetallic thermostat bar 48, closed contacts 45 and 46, and thence through the resilient switch arm 47 to the ground, or other side of the supply source. When the power relay is energized, it will operate to close the contacts 62 so as to electrically connect the blanket between the positive side of the supply source and the ground. When the support 17 is moved clockwise responsively to the contraction of the wire 12 as it cools, it will move the thermostat 48 to separate the contacts 45 and 46 and thereby deenergize the blanket 10. In this way the power input of the blanket 10 is controlled.

As has been pointed out, the thermostat 48 responds to the ambient temperature. If the ambient temperature is within the range set by the adjusting screw 50, the contact 46 will contact contact 45 and complete the power circuit for the blanket 10, as just described. The contact 46 remains in contact with the contact 45 from the point where they first contact in the counterclockwise movement of the support 17 until the support 17 has been returned to that point in the reverse movement. If the ambient temperature decreases to deflect the bar 48 downwardly, the proportion of time that power is supplied to the blanket 10 to the time that it is not supplied for each cycle of operation of the wire 12 increases and, therefore, the larger will be the percentage of the rated wattage of the blanket that will be actually dissipated in it. When the ambient temperature becomes low enough, the bimetallic bar 48 will have moved sufficiently far to close the gap between the contacts 45 and 46 even though the contact 36 is against the contact 34. Under this condition of operation the power relay 60 will be continuously energized and the blanket will be operated at its full rating, irrespective of the fact that the timing wire is oscillating the support 17 continuously. Conversely, when the ambient temperature increases, the bar 48 will move upwardly to increase the gap between the contacts 45 and 46, and, consequently, the proportion of time that they are closed to energize the blanket to the time that they are opened to deenergize it will decrease. This results in the blanket operating at lower percentages of its rated wattage. If the ambient temperature becomes sufficiently high, the bar 48 will have been deflected upwardly so far that the switch contacts 45 and 46 will not be closed even when the support 17 is being continuously operated, and under this condition of operation, no power will be supplied to the blanket 10.

In this way the circuit controlling device compensates for ambient temperature variations within wide limits so that the power supplied to the blanket is varied in order to hold a substantially uniform temperature.

The temperature that is held in the blanket is adjusted by the adjusting screw 50.

The resistor 70 is provided in order to prevent the short-circuiting of the system when contacts 35 and 36 are closed. It will be observed that when these contacts are closed, there is a direct connection between the positive side of the line through contacts 58 and resistor 70 to the ground or negative side of the line; if the resistor were not in series in this circuit, a short circuit would develop.

The resistor 72 functions as a current limiting or control resistance for predetermining the amount of current to flow through the wire 12.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. A circuit controlling device comprising a switch, an elongated thermally contractible and expansible wire, means controlled by said wire for periodically heating it and permitting it to cool so that it expands and contracts in an operative cycle, connection means between said wire and said switch for periodically operating said switch between a plurality of circuit controlling positions, and said connection means including a thermal element for determining in accordance with the ambient temperature the respective proportions of the time of said operative cycle that said switch is in said respective positions.

2. A circuit controlling device comprising an electro-thermally expansible and contractible wire, a pivotally mounted member connected to said wire so as to be periodically oscillated by the expansion and contraction of said wire, switch means controlled by said member for alternately energizing and deenergizing said wire to cause it to expand and contract to oscillate said member, a second switch for controlling said circuit, and a thermostat responsive to ambient temperature operated by the oscillation of said member controlling the operation of said second switch.

3. A circuit controlling device comprising an electro-thermally expansible and contractible wire, a pivotally mounted support connected to said wire so as to be periodically oscillated by the expansion and contraction of the wire, a control switch having a pair of spaced fixed contacts, and also a relatively movable contact that is connected to said support so as to be moved alternately into engagement with said fixed contacts as said support is oscillated, means controlled by the alternate engagement of said movable contact with said fixed contacts for alternately energizing and deenergizing said wire to cause it to periodically oscillate said support, a second switch for controlling the circuit having a fixed contact and a movable contact, and an ambient temperature compensating thermostat connected to said support so as to oscilltae with it operating said second switch movable contact into and out of engagement with its fixed contact, the proportion of time of each cycle of oscillation of said support that said contacts are in engagement to the time that they are out of engagement depending upon the deflection of said thermostat.

4. A circuit controller comprising an elongated electro-thermally expansible and contractible timing wire, means anchoring one end of said wire, a pivotally mounted support connected to the other end of said wire, a spring connected to said support so as to tension said wire, said support being oscillated periodically as said wire expands and contracts, a switch arm on said support oscillated thereby, switch contacts controlled by said arm for alternately energizing and deenergizing said wire to cause it to expand and contract, a bimetallic bar exposed to ambient temperature secured to said support so as to oscillate with it, and circuit controlling contacts opened and closed by said bimetallic bar, the proportion of the time of each cycle of oscillation of said support that said contacts are open to the time they are closed depending upon the temperature of said bimetallic bar.

FRANK E. FINLAYSON.